US012789266B2

(12) United States Patent
Novak et al.

(10) Patent No.: US 12,789,266 B2
(45) Date of Patent: Nov. 10, 2026

(54) STEP DRILL BITS

(71) Applicant: BLACK & DECKER INC., New Britain, CT (US)

(72) Inventors: Joseph T. Novak, East Longmeadow, MA (US); Matthew Christopher Green, Amherst, MA (US); Andrew C. Reist, Springfield, MA (US); Martin Morris, East Longmeadow, MA (US); Nicholas Richard Sibilia, Springfield, MA (US); Johnny Curtis Adams, Feeding Hills, MA (US); Erick Taylor Bailey, Vernon, CT (US)

(73) Assignee: BLACK & DECKER INC., New Britian, CT (US)

( * ) Notice: Subject to any disclaimer, the term of this patent is extended or adjusted under 35 U.S.C. 154(b) by 453 days.

(21) Appl. No.: 17/663,447

(22) Filed: May 16, 2022

(65) Prior Publication Data

US 2022/0371105 A1 Nov. 24, 2022

Related U.S. Application Data

(60) Provisional application No. 63/190,503, filed on May 19, 2021.

(51) Int. Cl.
*B23B 51/02* (2006.01)
*B23B 51/00* (2006.01)

(52) U.S. Cl.
CPC ........ *B23B 51/0007* (2022.01); *B23B 51/009* (2013.01); *B23B 2251/04* (2013.01); *B23B 2251/14* (2013.01)

(58) Field of Classification Search
CPC ... B23B 51/00; B23B 51/009; B23B 51/0003; B23B 2251/505; B23B 2222/32;
(Continued)

(56) References Cited

U.S. PATENT DOCUMENTS

| | | | |
|---|---|---|---|
| 2,950,523 | A | 8/1960 | Aloysius et al. |
| 3,645,640 | A | 2/1972 | Zukas |

(Continued)

FOREIGN PATENT DOCUMENTS

| | | | |
|---|---|---|---|
| CN | 206185204 | U | 5/2017 |
| CN | 110625121 | A | 12/2019 |

(Continued)

OTHER PUBLICATIONS

Griggs Steel Company, "High Speed Cobalt" (Year: 2020).*

(Continued)

*Primary Examiner* — Alan Snyder

(74) *Attorney, Agent, or Firm* — Jordan IP Law LLC; Todd A. Vaughn

(57) ABSTRACT

A step drill bit includes a body with a plurality of cylindrical steps of increasing diameter from a front end toward a rear end, a flute extending from the front end toward the rear end, and cutting edges at junctions between each step and the flute. A cutting insert with a hardness greater than the hardness of the body is coupled to the front end portion and at least partially defines a cutting head portion. The cutting head portion includes a center cutting tip, a cutting edge extending radially outward from the cutting tip, a rake face extending from the cutting edge toward the rear end portion, a relief face extending from the cutting edge in a circumferential direction opposite a rotational cutting direction of the drill bit, and a chip clearing recess in communication with the flute, with the rake face facing the chip clearing recess.

22 Claims, 20 Drawing Sheets

(58) Field of Classification Search
CPC ............ B23B 51/0009; B23B 2222/16; B23B 2222/28; B23B 2226/31
USPC .......................................................... 408/224
See application file for complete search history.

(56) References Cited

U.S. PATENT DOCUMENTS

| | | | | | |
|---|---|---|---|---|---|
| 4,582,458 | A * | 4/1986 | Korb | B23B 51/009 | 408/224 |
| 4,655,648 | A | 4/1987 | Hellbergh | | |
| 5,570,978 | A | 11/1996 | Rees et al. | | |
| 8,388,280 | B1 * | 3/2013 | Ison | B23B 51/0081 | 408/231 |
| 8,764,355 | B2 | 7/2014 | Durfee | | |
| 8,898,911 | B2 | 12/2014 | Jordan et al. | | |
| 9,555,483 | B2 | 1/2017 | Jordan et al. | | |
| 2004/0076483 | A1 * | 4/2004 | Singh | B23B 51/009 | 408/1 R |
| 2007/0020057 | A1 * | 1/2007 | Chen | B23B 51/009 | |
| 2007/0264094 | A1 | 11/2007 | Seeley | | |
| 2008/0029311 | A1 | 2/2008 | Seeley | | |
| 2009/0214309 | A1 | 8/2009 | Rees et al. | | |
| 2012/0207557 | A1 * | 8/2012 | Durfee | B23B 51/009 | |
| 2014/0023445 | A1 * | 1/2014 | Allen | B23B 51/009 | 408/224 |
| 2014/0369776 | A1 * | 12/2014 | Durfee | B23B 51/009 | 408/224 |
| 2015/0360303 | A1 | 12/2015 | Furukawa | | |
| 2019/0030620 | A1 * | 1/2019 | Piper | B23B 51/009 | |
| 2019/0039151 | A1 * | 2/2019 | Morton | B24B 19/04 | |
| 2019/0143422 | A1 * | 5/2019 | Allen | B23B 51/0081 | 408/16 |
| 2020/0108449 | A1 * | 4/2020 | Brodksi | B23B 51/0003 | |
| 2021/0170502 | A1 * | 6/2021 | Van Essen | B23B 31/1071 | |
| 2021/0197295 | A1 * | 7/2021 | Ward | B23B 51/009 | |

FOREIGN PATENT DOCUMENTS

| | | | | | |
|---|---|---|---|---|---|
| CN | 110681891 | A * | 1/2020 | B23B 51/009 |
| DE | 112017005400 | T5 * | 7/2019 | B23B 51/02 |
| DE | 102018115624 | A1 * | 1/2020 | B23B 51/009 |
| DE | 102018005731 | B4 | 10/2020 | |
| EP | 3560643 | A1 * | 10/2019 | B23B 51/009 |
| WO | WO-2021154521 | A1 * | 8/2021 | B22F 10/18 |

OTHER PUBLICATIONS

English CN110681891A Translation (Year: 2020).*
Extended European Search Report, EP Application No. 22174256.2, Sep. 11, 2022, 8 pages, EPO.

* cited by examiner

STEP DRILL BITS

RELATED APPLICATION

This application claims priority under 35 U.S.C. § 119(e) to U.S. Provisional Application No. 63/190,503, filed May 19, 2021, titled "Step Drill Bits," which is incorporated by reference.

TECHNICAL FIELD

This application relates to step drill bits (also known as step bits or tree bits).

BACKGROUND

Step drill bits are used to form holes of various diameters in a workpiece, such as sheet metal or thin metal plates. Existing step drill bits tend to be expensive to manufacture and having cutting tips and cutting edges that tend to wear out quickly.

SUMMARY

In an aspect, a step drill bit includes a body having a front end and a rear end, a plurality of steps that increase in diameter from the front end to the rear end, and a flute that extends from the front end to the rear end. A shank is coupled to the rear end and configured to be received in a tool holder of a rotary power tool. A cutting head is coupled to the front end and includes a cutting tip configured to penetrate a workpiece. An elongated cutting strip has a first end coupled to the front end of the body adjacent the flute, a second end coupled to the rear end of the body adjacent the flute, and a plurality of steps that are continuous with the steps in the body. The elongated cutting strip defines a cutting edge that extends along the steps in the strip. The body is composed of a first material. The cutting head is formed of a second material having a greater hardness than the first material. The cutting strip is composed a third material having a greater hardness than the first material.

Implementations of this aspect may include one or more of the following features. The first material may be a low carbon steel or tool steel. Each of the second material and the third material may be, e.g., a hard metal material, carbide, cermet, diamond, or high speed steel material. The second material may be different than or the same as the third material. Each of the cutting tip and the cutting strip may be joined to the body by brazing, welding, adhesive, or mechanical connection (e.g., press fit or interference fit). The body may include a front bore in its front end and the cutting head may include a post received in the front bore. The front bore and the post may have a cylindrical, conical, or non-circular geometry. The cutting head may include a flute aligned with the flute in the body. The cutting head may include a first step or set of steps that is smaller in diameter than the smallest diameter step at the front end of the body. The cutting head may be integral with the cutting strip or separate from the cutting strip. The flute in the body may include a recess defined therein. The body may include a longitudinal slot that receives the cutting strip. The shank may be formed integrally with the body or may be a separate piece from the body. The body may include a rear bore and the shank may include a front projection received in the rear bore. The rear bore and the front projection may have a cylindrical, conical, or non-circular geometry.

In another aspect, a method of manufacturing a step drill bit includes the following steps. A near net shape body is formed from a first material using metal injection molding or powder metal molding, the body having a front end and a rear end, a plurality of steps that increase in diameter from the front end to the rear end, and a flute that extends from the front end to the rear end. A near net shape cutting head with a cutting tip configured to penetrate a workpiece is formed from a second material that has a greater hardness than the first material. The cutting head is joined to the front end of the body. A finish grind is applied to the body and the cutting head.

Implementations of this aspect may include one or more of the following features. The near net shape body may be heat treated before or after it is joined to the cutting head or together in the same process with joining to the cutting head. A near net shape shank may be formed and joined to the rear end of the body. A shank is coupled to the rear end and configured to be received in a tool holder of a rotary power tool. A near net shape elongated cutting strip is formed from a third material having a greater hardness than the first material. The cutting strip may have a first end coupled to the front end of the body adjacent the flute, a second end coupled to the rear end of the body adjacent the flute, and a plurality of steps that are continuous with the steps in the body when joined to the body. The elongated cutting strip may define a cutting edge that extends along the steps in the strip. The first material may be a low carbon steel or tool steel. Each of the second material and the third material may be, e.g., a hard metal material, carbide, cermet, diamond, or high speed steel material. The second material may be different than or the same as the third material. Each of the cutting tip and the cutting strip may be joined to the body by brazing, welding, adhesive, or a mechanical connection (e.g., press fit or interference fit). A front bore may be formed in the front end of the body and the cutting head may be formed with a post received in the front bore. The front bore and the post may have a cylindrical, conical, or non-circular geometry. The cutting head may be formed with a flute aligned with the flute in the body. The cutting head may be formed with a first step or set of steps that is smaller in diameter than the smallest diameter step at the front end of the body. The cutting head may be formed integrally with the cutting strip or separately from the cutting strip. The body may be formed with a recess defined in the flute. The body may be formed with a longitudinal slot that receives the cutting strip. The shank may be formed integrally with the body or may be a separate piece from the body. The body may be formed with a rear bore and the shank may be formed with a front projection received in the rear bore. The rear bore and the front projection may have a cylindrical, conical, or non-circular geometry, and or may be threaded or unthreaded.

In another aspect, a step drill bit includes a body composed of high speed steel, the body defining a rotational axis and including a front end portion, a plurality of cylindrical steps of increasing diameter from the front end portion toward the rear end portion of the body, and a flute extending rearward from the front end portion toward the rear end portion, each step defining a cutting edge at a junction between the step and the flute. A shank is coupled to the rear end portion of the body, and receivable in a tool holder of a rotary power tool. A cutting insert is coupled to the front end portion and at least partially defines a cutting head portion of the drill bit. The cutting insert has a hardness greater than the high speed steel, the cutting insert composed of carbide, cermet, or diamond. The cutting head portion includes a center cutting tip, a cutting edge that extends radially outward from the cutting tip, a rake face extending from the cutting edge toward the rear end portion of the body, a relief face extending from the cutting edge in a circumferential direction opposite a rotational cutting direction of the drill bit, and a chip clearing recess in communication with the flute with the rake face facing the chip clearing recess in the rotational cutting direction of the drill bit.

Implementations of this aspect may include one or more of the following features. The front end portion may include a slot transverse to the rotational axis and the cutting insert may include a base portion with a prismatic shape received in the slot, where the cutting head portion may be defined partially by cutting insert and partially by the front end portion of the body. The cutting insert may include the center cutting tip, the cutting edge, the rake face, and a leading portion of the relief face extending from the cutting edge. The front end portion may include the chip clearing recess with the rake face of the cutting insert facing the chip clearing recess, and a trailing portion of the relief face extending circumferentially from the leading portion of the relief face in the direction opposite the rotational direction of the drill bit. The cutting head portion may be formed entirely from the cutting insert, with the cutting insert including the center cutting tip, the cutting edge, the rake face, the relief face, and the chip clearing recess with the rake face facing the chip clearing recess in the rotational cutting direction of the drill bit.

The cutting insert may further define a first cylindrical step having a first diameter that is greater than the diameter of the cutting head portion and smaller than diameters of each of the cylindrical steps on the body. The body may include a second flute diametrically opposite the flute. The cutting head portion may include a second cutting edge that extends radially outward from the cutting tip diametrically opposite the cutting edge, a second rake face extending from the second cutting edge toward the rear end portion of the body, a second relief face extending from the cutting edge in a circumferential direction opposite the rotational cutting direction of the drill bit, and a second chip clearing recess in communication with the second flute with the second rake face facing the chip clearing recess in the rotational cutting direction of the drill bit. The cutting tip may include a chisel edge extending between the cutting edge and the second cutting edge.

The rake face of the cutting head portion may be disposed at a positive rake angle, e.g., approximately 5° to 15°, relative to the rotational axis. The relief face of the cutting head portion may be disposed at a relief angle, e.g., approximately 15° to 35° relative a plane orthogonal to the rotational axis. In another implementation, the relief face of the cutting head portion may have a primary relief surface adjacent the cutting edge and disposed at a primary relief angle, e.g., approximately 15° to 35°, and a secondary relief surface trailing the primary relief surface in the rotational cutting direction and disposed at secondary relief angle that is greater than the primary relief angle, e.g., approximately 25° to 35°. The cutting insert may be affixed to the front end portion by braze that has a melting temperature less than and a vaporization temperature greater than a heat treat temperature for heat treating the high speed steel prior to rapidly cooling and tempering the high speed steel. The heat treat temperature of the high speed steel may be between approximately 2000° F. and 2200° F. and the melting temperature of the braze may be at least approximately 1800° F. The high speed steel may have a Rockwell hardness of at least 60 HRC. Cutting edges in the body and the center cutting tip and the cutting edge in the cutting head portion may be sharpened by one or more grinding operations. The body may be formed by metal injection molding or powder metal molding.

In another aspect, a step drill bit includes a body defining a rotational axis and including a front end portion, a plurality of cylindrical steps of increasing diameter from the front end portion toward the rear end portion of the body, and a flute extending rearward from the front end portion toward the rear end portion, each step defining a cutting edge at a junction between the step and the flute. A shank extending along the rotational axis is coupled to the rear end portion of the body and receivable in a tool holder of a rotary power tool. A cutting insert is coupled to the front end portion and at least partially defines a cutting head portion. The cutting head portion includes a center cutting tip, a cutting edge that extends radially outward from the cutting tip, a rake face extending from the cutting edge toward the rear end portion of the body, a relief face extending from the cutting edge in a circumferential direction opposite a rotational cutting direction of the drill bit, and a chip clearing recess in communication with the flute with the rake face facing the chip clearing recess in the rotational cutting direction of the drill bit. An elongated cutting strip is at least partially received in the flute and includes a plurality of steps each defining a cutting edge. The steps on the elongated strip have diameters that correspond to the diameters of the steps in the body. The body is composed of a first material having a first hardness, the cutting head is composed of a second material having a greater hardness than the first hardness, and the cutting strip is composed a third material having a third hardness that is greater than the first hardness.

Implementations of this aspect may include one or more of the following features. The first material may be a low carbon steel or a tool steel, the second material may be a carbide, cermet, diamond, or high speed steel, and the third material may be a carbide, cermet, diamond, or high speed steel. The cutting head portion may include a first step that is smaller in diameter than the step at the front end of the body. The front end portion may include a slot transverse to the rotational axis and the cutting insert may include a base portion with a prismatic shape received in the slot, and the cutting head portion may be defined partially by cutting insert and partially by the front end portion of the body. The cutting head portion may be formed entirely from the cutting insert, with the cutting insert including the center cutting tip, the cutting edge, the rake face, the relief face, and the chip clearing recess with the rake face facing the chip clearing recess in the rotational cutting direction of the drill bit.

Advantages may include one or more of the following. In one aspect, the harder material cutting head and/or cutting strip may increase the life and durability of the step drill bit, while still using a less expensive and softer material for the body. In another aspect, the body may be formed of a high speed steel and the cutting insert may be formed of a harder material than high speed steel (e.g., carbide, cermet, or diamond) to increase life and durability without necessitating the use of a carbide strip. The cutting head joined to the body by a braze that has a melting temperature less than a heat treat temperature of the body and a vaporization temperature greater than the heat treat temperature of the body to facilitate more efficient manufacturing and heat treatment. The body may be formed as a near net shape body, e.g., by metal injection molding or powder metal molding, which reduces material waste and manufacturing cost. These and other advantages and features will be apparent from the description, the drawings, and the claims.

DETAILED DESCRIPTION

Figure 1B:
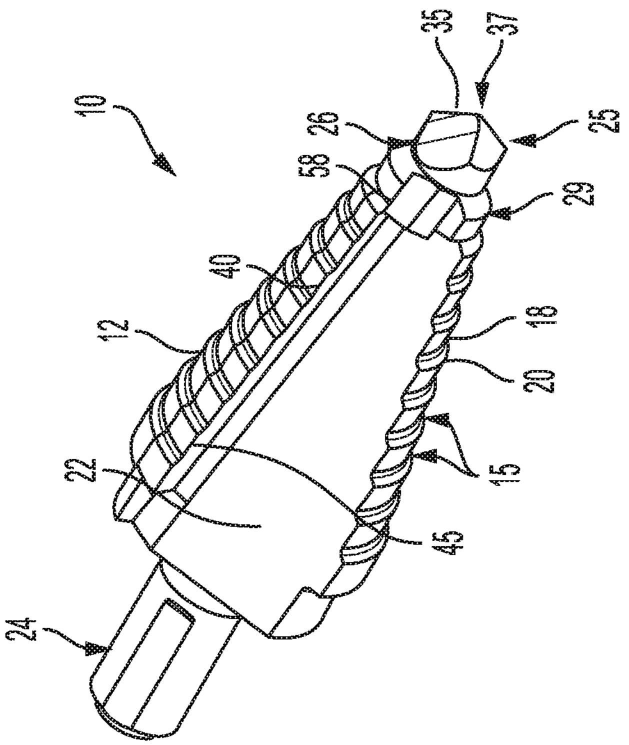
FIGS. 1A and 1B are perspective views of an embodiment of a step drill bit.
Figure 1A:
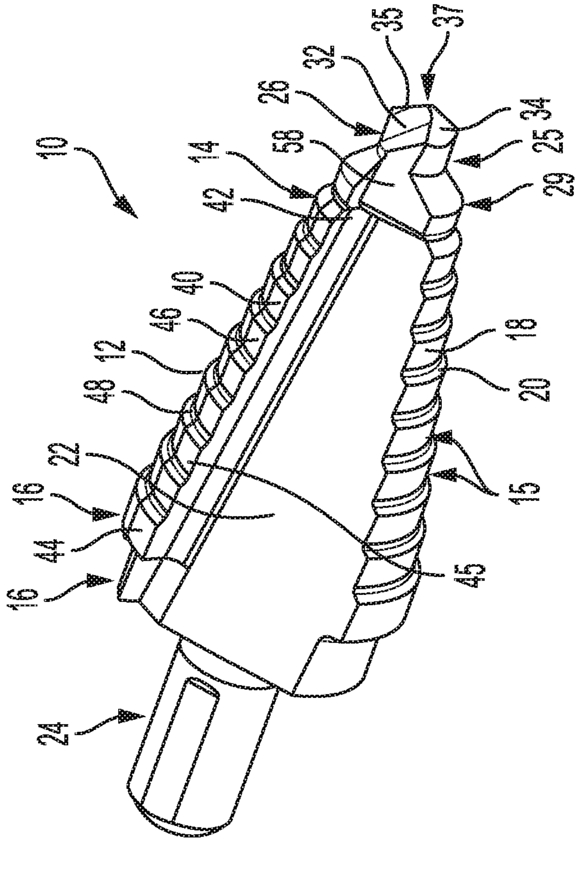

Referring to FIGS. 1A-1B, an embodiment of a step drill bit 10 includes a body 12 having a front end portion 14 and a rear end portion 16. The body 12 has a plurality of steps 15, each having a cylindrical portion 18 and a tapered portion 20, the cylindrical portions 18 increasing in diameter from the front end portion 14 to the rear end portion 16. At least one flute 22 (e.g., a flat surface that interrupts the steps 15) is formed in the body 12 and extends from the front end portion 14 to the rear end portion 16. There may be only one flute, two flutes, or a greater number of flutes. The flute(s) may be flat, concave, or have an alternative configuration. A shank 24 is coupled to the rear end portion 16 of the body 12 and configured to be received in a tool holder (e.g., a chuck or tool bit holder) of a rotary power tool (e.g., a drill, a drill/driver, or an impact driver). In the illustrated embodiment, the shank 24 is generally cylindrical with at least one flat for being engaged by a portion of the tool holder, such as chuck jaws. As illustrated, the shank 24 is formed integrally with the body 12. In other embodiments, the shank 24 may be a separate piece from the body 12.

A cutting insert 25 is coupled to the front end portion 14 to form a cutting head portion 26 and is configured to penetrate a workpiece. In the illustrated embodiment, the cutting head portion 26 is formed entirely of the cutting insert 25. In other embodiments, the cutting head portion 26 may be formed in part by the cutting insert 25 and in part by the front end portion 14. The cutting head portion 26 includes a center cutting tip 37 including a chisel edge 139, at least one cutting edge 35 extending radially outward and axially rearward from the center cutting tip 37, a rake face 32 extending rearward from the cutting edge 35 toward the rear end portion 16, and a relief face 34 extending circumferentially from the cutting edge 35 in a direction opposite the rotational cutting direction of the drill bit. In an embodiment, the rake face 32 of the cutting head is disposed at a positive rake angle, e.g., approximately 5° to 15°, relative to the rotational axis X. The relief face of the cutting head is disposed at a relief angle of approximately 15° to 35° relative a plane orthogonal to the rotational axis X.

The body 12 includes a front bore in its front end portion 14 and the cutting head portion 26 includes a post 27 received in the front bore. As illustrated the front bore and the post 27 each have a cylindrical geometry. However, they may have other geometries such as being conical or having a non-circular geometry (e.g., a hex shaped or double-D shaped cross-section). The cutting head portion 26 also includes a chip clearing recess 58 in communication with and adjacent to the flute 22 in the body 12. The cutting head portion 26 also may include a first step 29 that is smaller in diameter than the smallest diameter step at the front end portion 14 of the body 12. The first step 29 has a first cylindrical portion 31 and a first tapered portion 33 similar to the cylindrical portions 18 and tapered portions 20 of the body 12 but with a smaller diameter.

An elongated cutting strip 40 has a first end 42 coupled to the front end portion 14 of the body 12 adjacent the flute 22 in the body 12 and a second end 44 coupled to the rear end portion 16 of the body 12 adjacent the flute 22 in the body 12. The cutting strip 40 includes a plurality of steps 15, each having a partially cylindrical portion 46 and a partially tapered portion 48 that are continuous with the cylindrical portion 18 and the tapered portion 20 of the steps 15 in the body 12. The elongated cutting strip 40 defines a cutting edge 45 that extends along the steps 15 in the strip. The body 12 includes a longitudinal slot 52 adjacent the flute 22 that receives the cutting strip 40. As illustrated, the cutting strip 40 and the cutting head portion 26 are formed as separate components.

The body 12 and/or the shank 24 may be formed from a first material, such as a low carbon steel or tool steel. The cutting head portion 26 may be formed from a second material that is harder and more durable than the first material, such as a hard metal material, carbide, cermet, diamond, or high speed steel material. The cutting strip 40 may be formed from a second material that is harder and more durable than the first material, such as a hard metal material, carbide, cermet, diamond, or high speed steel material. The second material may be different than or the same as the third material. Each of the cutting tip and the cutting strip 40 may be joined to the body 12 by brazing, welding, adhesive, or mechanical connection (e.g., press fit or interference fit).

Figure 2A:
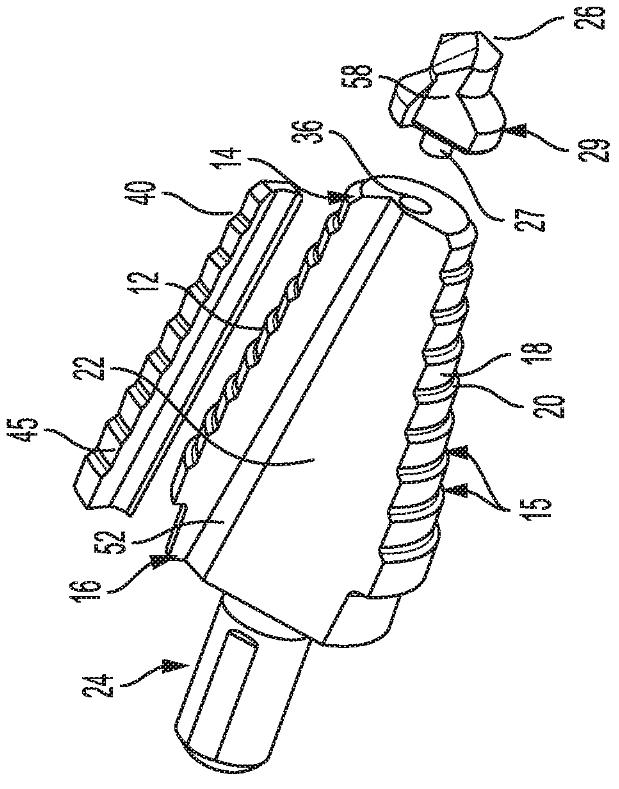
FIG. 2A is an exploded view of an embodiment of a step drill bit.
Figure 2B:
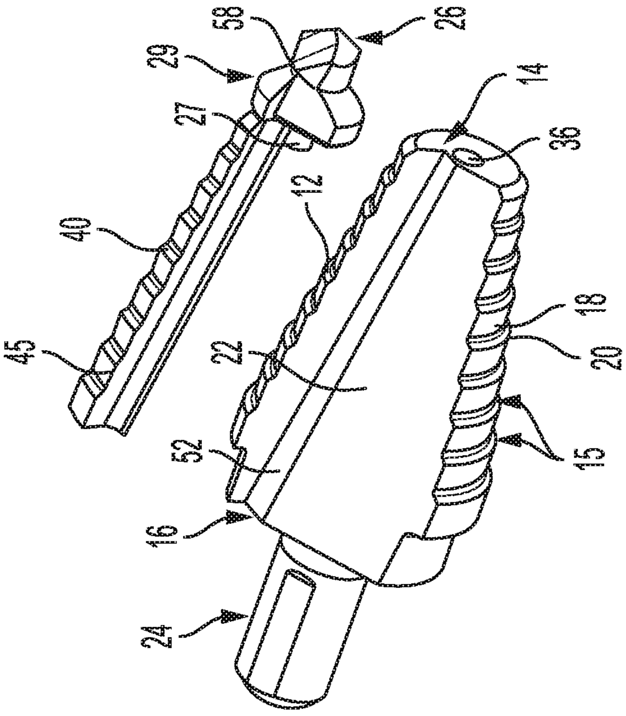
FIG. 2B is an exploded view of another embodiment of a step drill bit.

Referring to FIG. 2A, in an embodiment, the cutting strip 40 and the cutting head portion 26 may be formed as separate components. In this embodiment, the cutting strip 40 and the cutting head portion 26 may be composed of the same material (e.g., carbide having the same grade) or different materials (e.g., different grades of carbide) having a hardness greater than the hardness of the body 12. Referring to FIG. 2B, in another embodiment, the cutting strip 40 and the cutting head portion 26 may be formed as a single integral component. In this embodiment, the cutting strip 40 and cutting head portion 26 may be composed of the same material (e.g., carbide having a similar grade) having a hardness greater than a hardness of the body 12.

Figure 3C:
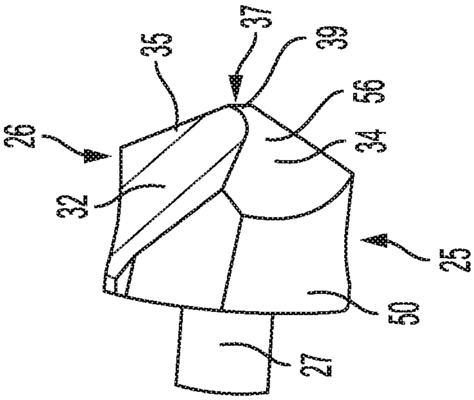
FIGS. 3A-3F are perspective views of embodiments of cutting inserts for the aforementioned step drill bits.
Figure 3B:
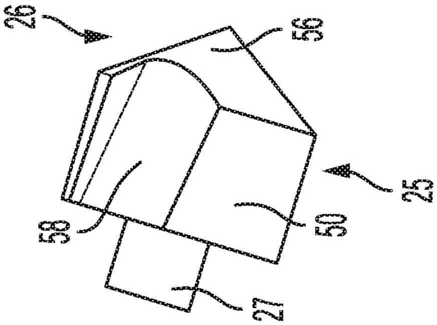
Figure 3A:
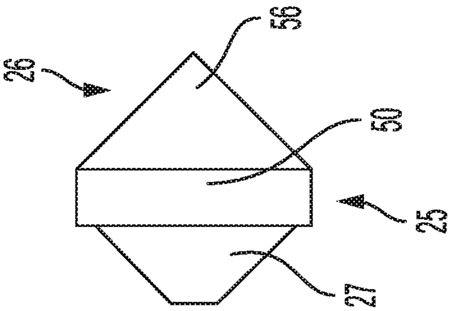

Referring to FIGS. 3A-3F, the cutting insert 25 or head 26 may be formed, e.g., by casting carbide, sintering carbide, or other net or near net shape forming of carbide such as metal injection molding or powder metal forging. FIGS. 3A-3C illustrate an embodiment of a cutting head portion 26 that may be coupled to the body 12. As shown in FIG. 3A, the cutting insert 25 or head 26 is initially formed as a blank 28 with a conical tip portion 56, an intermediate cylindrical portion 50, and a rear post 27 that is receivable in the front bore of the body 12. As shown in FIG. 3B, the cutting head portion 26 is then ground or machined to form a partially or near net form that includes a conical tip portion 56, an intermediate cylindrical portion 50, a rear post 27 that is receivable in the front bore of the body 12, and a chip clearing recess 58. As shown in FIG. 3C, the near net form cutting head portion 26 is then ground or machined only to form the cutting edge 35, rake face 32, and relief face 34. This reduces processing time, cost, and material waste. At the same time, the cutting edge 45 in elongated cutting strip 40 also may be ground or machined to sharpen the cutting edge 45, which further reduces processing time, cost, and material waste. The rear portion of the tip could be a round post 27, conical, cylindrical or another shape.

Figure 3F:
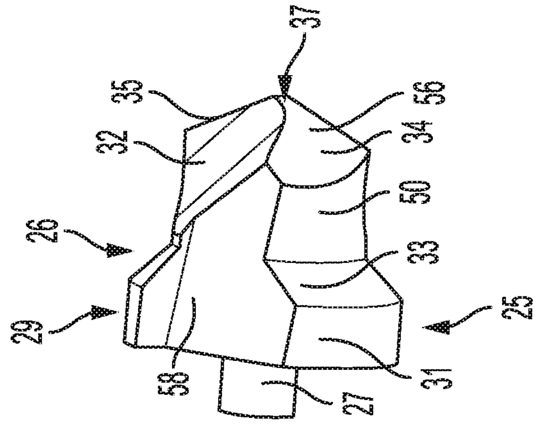
Figure 3E:
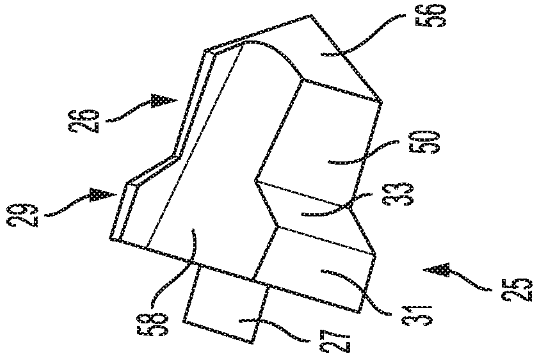
Figure 3D:
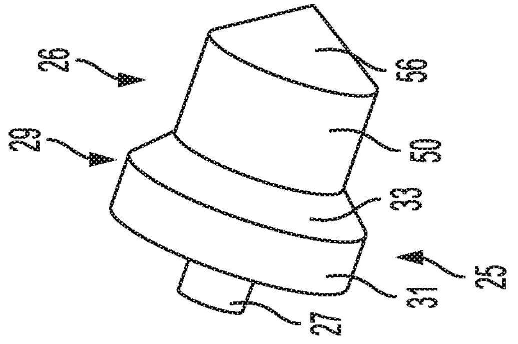

FIGS. 3D-3F illustrate another embodiment of a cutting insert 35 or head 26 that may be coupled to the body 12. The embodiment of FIGS. 3D-3F differs from the embodiment of FIGS. 3A-3C in that it further include a first step 29 with a cylindrical portion 31 and a tapered portion 33 between the post 27 and the intermediate cylindrical portion 50. As shown in FIG. 3D, the cutting head portion 26 initially is formed as a blank 28 that has a conical tip portion 56, an intermediate cylindrical portion 50, a first step 29 with a first tapered portion 33 and a first cylindrical portion 31, and a rear post 27 that is receivable in the front bore 36 of the body 12. As shown in FIG. 3E, the cutting head blank 28 is then ground or machined to form a near net shape with a chip clearing recess 58, either before or after joining the cutting head portion 26 to the body 12. As shown in FIG. 3F, the near net form cutting head portion 26 is then further ground or machined to form a cutting edge 35, a rake face 32, and a relief face 34, which reduces processing time, cost, and material waste.

Figure 4A:
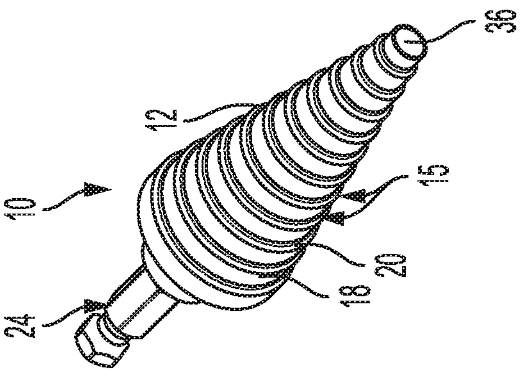
FIGS. 4A-4D schematically illustrate an embodiment of a manufacturing process for a step drill bit.
Figure 4B:
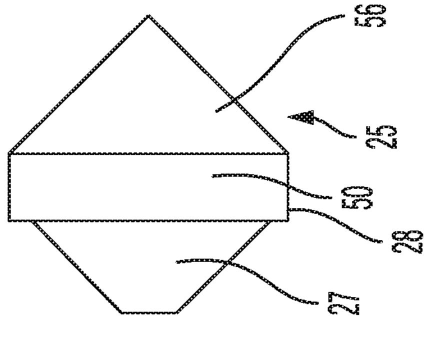
Figure 4C:
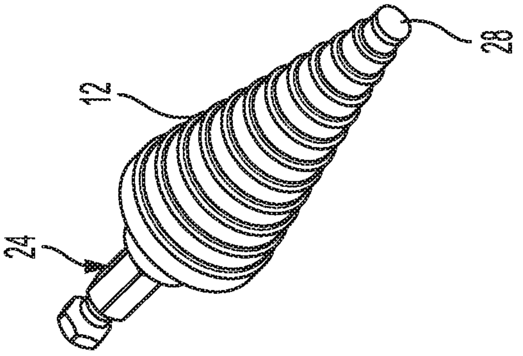
Figure 4D:
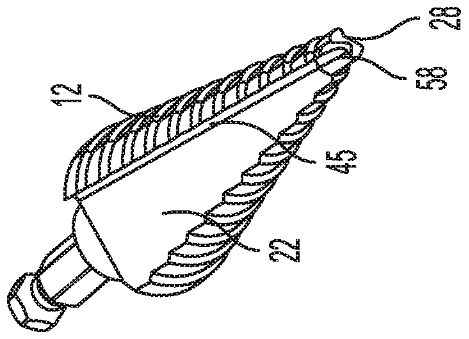

Referring to FIGS. 4A-4D, in an embodiment, a method of manufacturing one of the aforementioned embodiments of a step drill bit 10 includes the following steps. First, as shown in FIG. 4A, a near net shape of the body 12 and shank 24 are formed by grinding and/or machining a first piece of metal having a first hardness. The body 12 is formed with steps 15, each having a cylindrical portion 18 and a tapered portion 20, and with a front bore 36 in its front end portion 14 portion. Next, as shown in FIG. 4B, a cutting insert 15 in the form of a head blank 28 having a second hardness greater than the first hardness is formed. The cutting head blank 28 may be substantially similar to the cutting head blank 28 in FIG. 3A and has a frustoconical tip portion 56, a cylindrical intermediate portion 50, and a frustoconical rear post 27. As shown in FIG. 4C, the cutting head blank 28 is joined to the body 12 with the post 27 (e.g., a conical or non-round feature) received in the front bore 36 of the body 12 and joined to the body 12, e.g.., by brazing, welding, adhesive, or mechanical connection (e.g., press fit or interference fit). As part of the same or a separate step as joining, the body 12 and shank 24 are heat treated (e.g., by one or more heating and cooling cycles). In an embodiment, the cutting insert 25 may be affixed to the front end portion by braze that has a melting temperature less than the heat treat temperature and a vaporization temperature greater than the heat treat temperature for the body prior to rapidly cooling and tempering the high speed steel. For example, the heat treat temperature of the steel for the body may be between approximately 2000° F. and 2200° F. and the melting temperature of the braze may be at least approximately 1800° F., while its vaporization temperature is greater than 3000° F. After joining and heat treating, as shown in FIG. 4D, one or more grinding or machining steps is performed to form the flute 22 and cutting edge 45 in the elongated cutting strip 40 and to form one or more chip clearing recesses 58, cutting edges 35, rake faces 32, and relief faces 34 in the cutting head portion 26. Finally, the step drill bit is washed and etched.

Figure 5C:
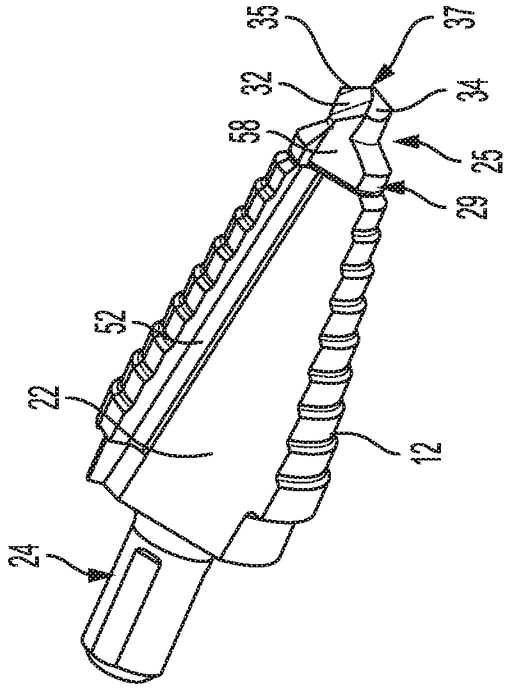
FIGS. 5A-5C schematically illustrate another embodiment of a manufacturing process for a step drill bit.
Figure 5B:
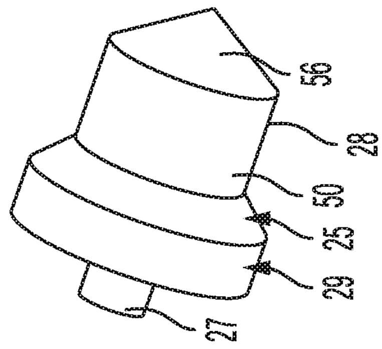
Figure 5A:
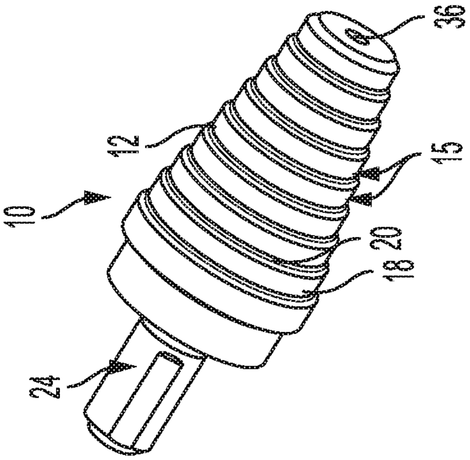

Referring to FIGS. 5A-5C, in another embodiment, a method of manufacturing a step drill bit is substantially the same as the method of manufacturing in FIGS. 4A-4D, except for the following differences. As shown in FIG. 5A, the body 12 and shank 24 are formed by grinding and/or machining a first piece of metal having a first hardness and formed with a cylindrical front bore 36. As shown in FIG. 5B, a cutting insert 25 in the form of a cutting head blank 28 is formed to a conical tip portion 56, a first step 29, with a first cylindrical portion 31 and a first tapered portion 33, and a cylindrical post 27, substantially similar to the cutting head portion 26 of FIG. 3D. The cutting head blank 28 is joined to the body 12 in the same manner as in FIGS. 4A-4D with the post 27 or other attachment geometry received in the front bore 36 of the body 12 and joined to the body 12, e.g.., by brazing, welding, adhesive, or mechanical connection (e.g., press fit or interference fit). As shown in FIG. 5C, one or more grinding or machining steps is performed to form the flute 22 and slot 52 in the body 12 and to form one or more chip clearing recesses 58, cutting edges 35, rake faces 32, and relief faces 34 in the cutting head portion 26. Finally, the step drill bit is washed and etched.

Figure 6C:
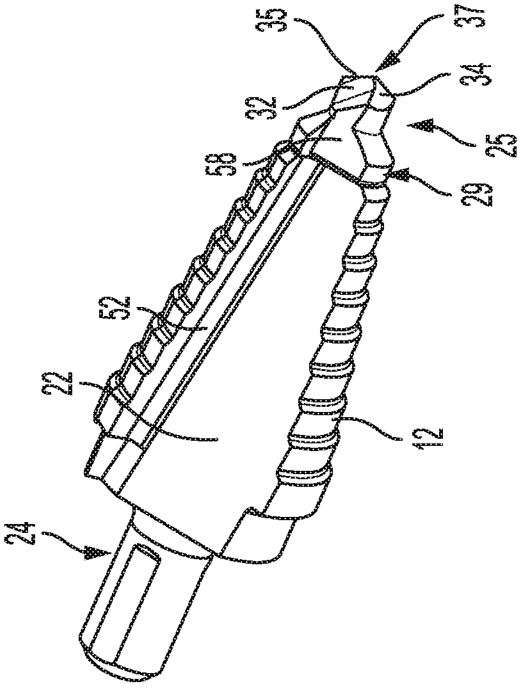
FIGS. 6A-6C schematically illustrate another embodiment of a manufacturing process for a step drill bit.
Figure 6B:
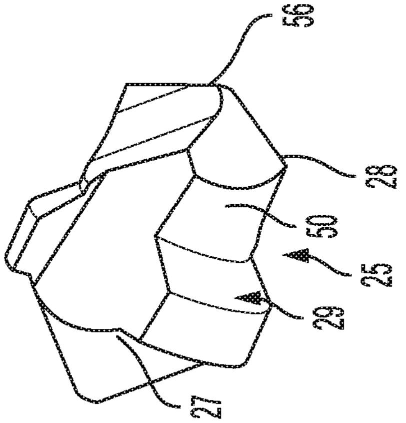
Figure 6A:
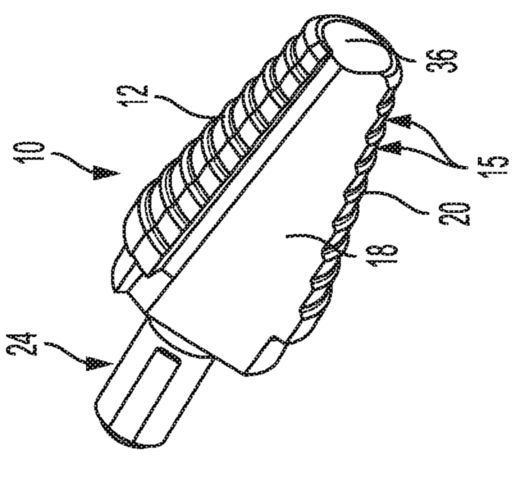
Figure 7A:
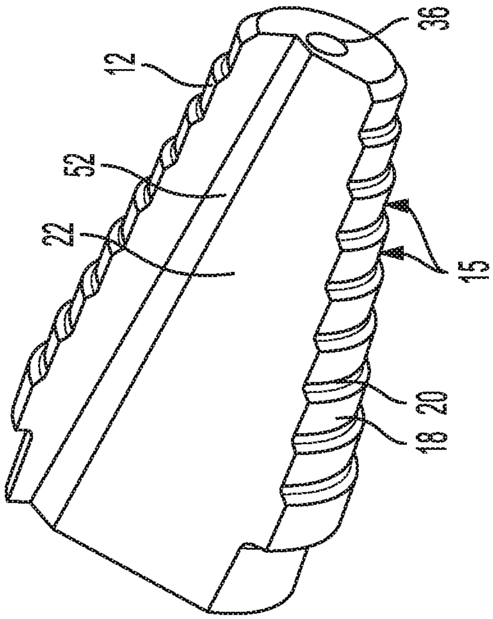
FIGS. 7A-7E schematically illustrate another embodiment of a manufacturing process for a step drill bit.
Figure 7C:
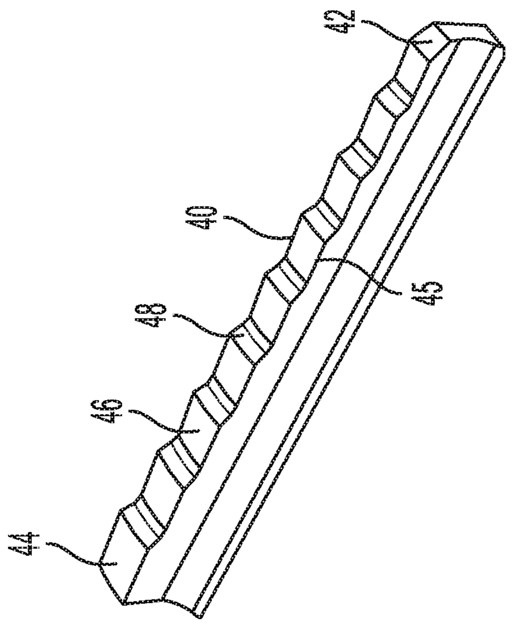
Figure 7B:
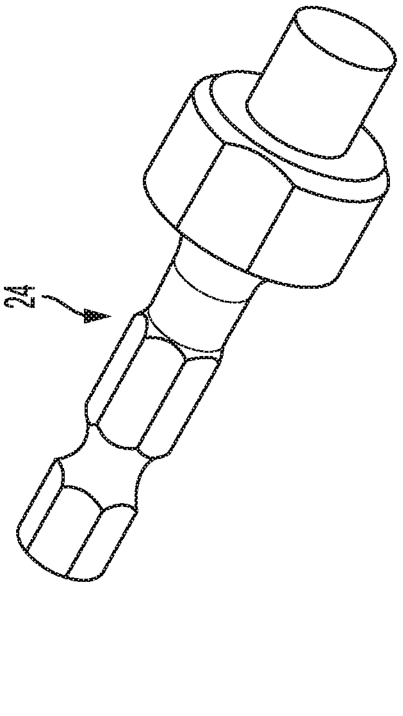
Figure 7E:
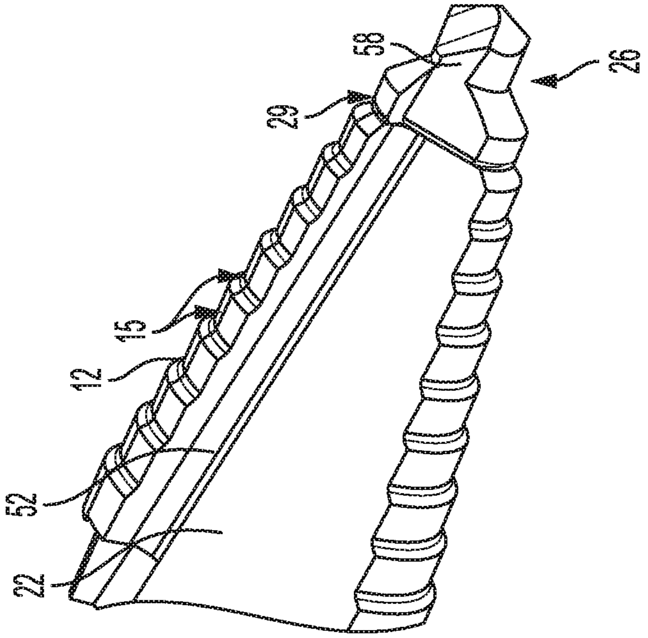
Figure 7D:
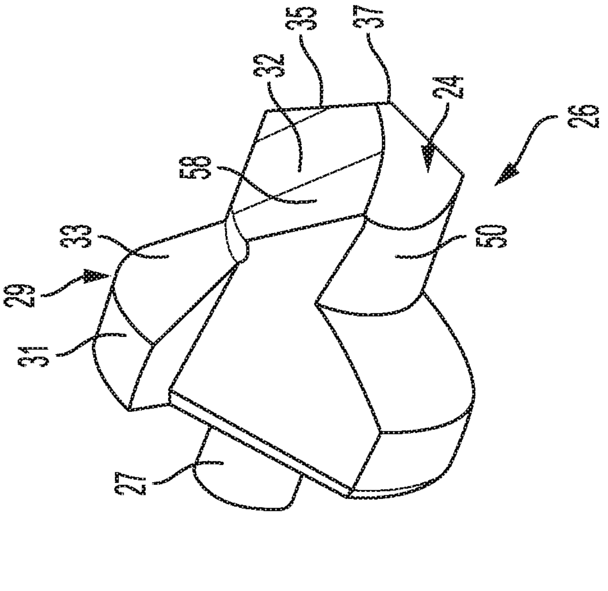

Referring to FIGS. 6A-6C, in another embodiment, a method of manufacturing a step drill bit is substantially the same as the method of manufacturing in FIGS. 5A-5D, except for the following differences. As shown ion FIG. 6A, a near net form body 12 is formed with steps 15, each having a cylindrical portion 18 and a tapered portion 20, a front bore 36 in its front end portion 14, a shank 24 at its rear end portion, and a flute 22. As shown in FIG. 6B, a cutting insert 25 in the form of a cutting head blank 28 is formed with a near net shape including a conical tip portion 56, a first step 29, with a first cylindrical portion 31 and a first tapered portion 33, chip clearing recesses 58, cutting edges 35, rake faces 32, and relief faces 34 in the cutting head portion 26, substantially similar to the cutting head portion 26 of FIG. 3F. Next, as shown in FIG. 6C, the near net form of a cutting head blank 28 is joined to the body 12 in the same manner as in FIGS. 4A-4D with the post 27 received in the front bore 36 of the body 12 and joined to the body 12, e.g., by brazing, welding, adhesive, or mechanical connection (e.g., press fit or interference fit). One or more grinding or machining steps is performed only to sharpen the cutting edges 30 and 35. Finally, the step drill bit is washed and etched.

Figure 10A:
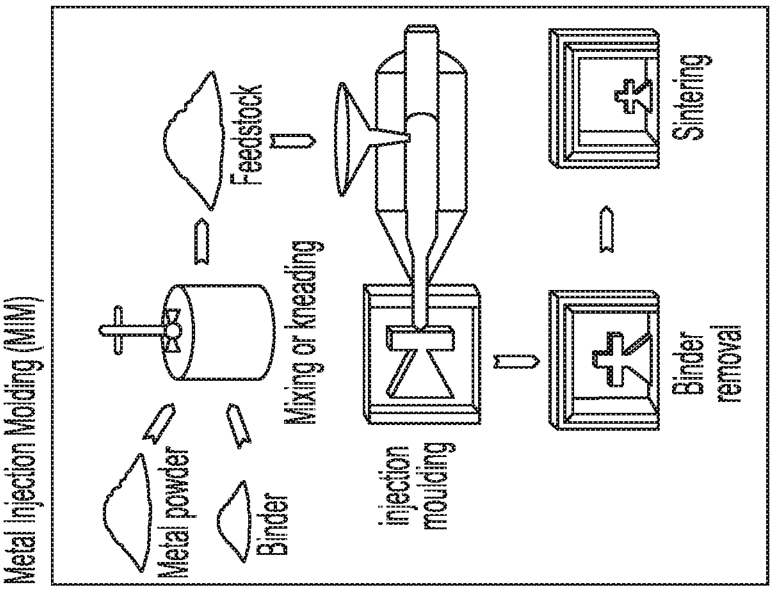
FIG. 10A schematically illustrates an embodiment of a metal injection molding manufacturing process.
Figure 10B:
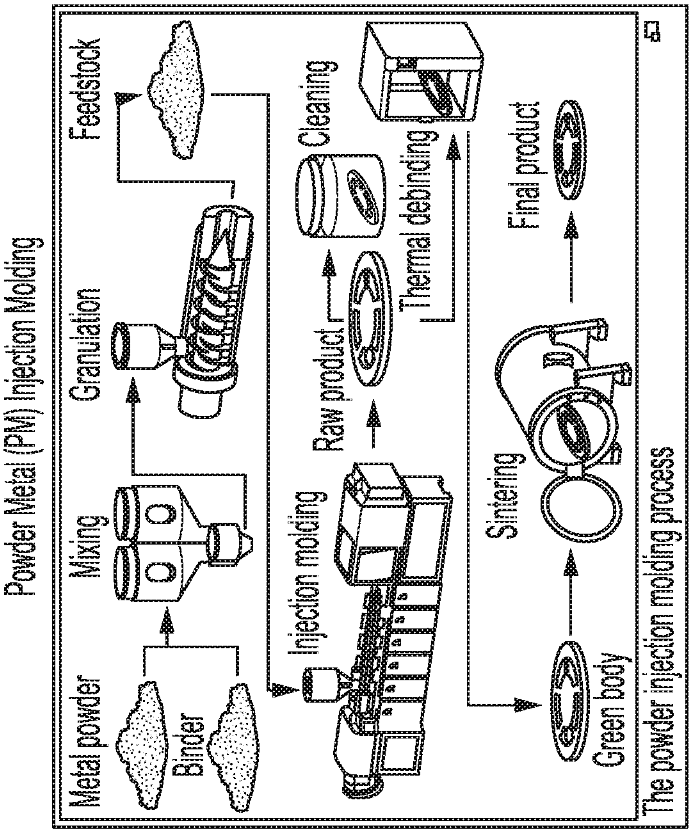
FIG. 10B schematically illustrates an embodiment of a powder metal injection molding manufacturing process.

Referring to FIGS. 7A-7E, in another embodiment, a method of manufacturing a step drill bit includes the following steps 15. First, a net shape of the body 12 is formed by metal injection molding (MIM) or powder metal (PM) injection molding. The MIM and PM processes are described and shown in FIGS. 10A and 10B, respectively. Using the MIM and PM processes are advantageous over machining because it results in less material waste. The MIM or PM body 12 is already formed with the steps 15 and flute(s) that will be in the final configuration of the body 12. The MIM or PM body 12 is also formed with a front bore 36 in its front end portion 14 portion, a rear bore 38 in its rear end portion 16 portion, and a groove for receiving the cutting strip 40. Also, a net shape cutting head portion 26, net shape cutting strip 40, and shank 24 are formed. The cutting head portion 26 and the cutting strip 40 each are composed of a second material having a second hardness greater than the first hardness of the body 12. For example, they may be formed using sintered carbide formed to have a net shape very close to the final shape of the cutting head portion 26 and cutting strip 40. The cutting head portion 26 and cutting strip 40 are substantially similar to the cutting head portion 26 and cutting strip 40 shown in FIGS. 1A and 2A. The shank 24 may be formed of the same or different material than the body 12 and may be formed in a net or near net shape (e.g., by casting, forging, metal injection molding, or powder metal molding or forging) or may machined from a piece of stock. The cutting head portion 26, body 12, and shank 24 are joined to the body 12 with the post 27 of the cutting head portion 26 received in the front bore 36 of the body 12, the cutting strip 40 received in the groove adjacent the flute 22 of the body 12, and the shank 24 received in the rear bore 38 of the body 12, with all three joined to the body 12, e.g.., by brazing, welding, adhesive, or mechanical connection (e.g., press fit or interference fit). The body 12 is also heat treated (e.g., by one or more heating and cooling cycles), before, during, or after the joining process. After joining and heat treating, one or more grinding or machining steps is performed to form a flute 22 relief in the body 12 and cutting edge in the body 12 and to form one or more flutes 22, cutting edges 35, rake faces 32, and relief faces 34 in the cutting head portion 26. Finally, the step drill bit is washed and etched.

Figure 8B:
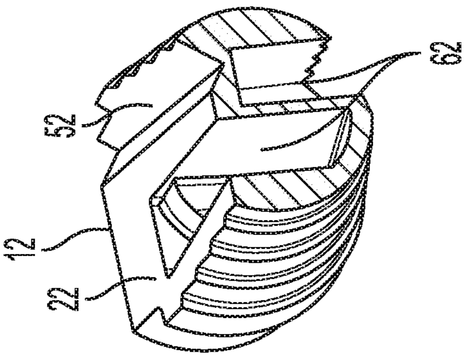
FIGS. 8A-8B are perspective views of another embodiment of a body of a step drill bit.
Figure 8A:
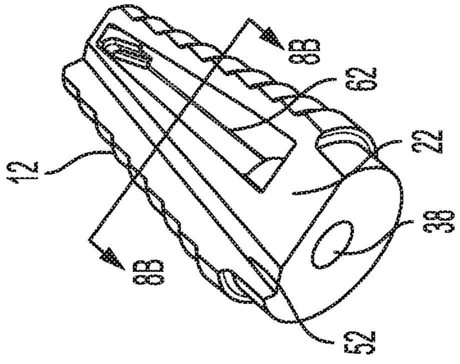

Referring to FIGS. 8A-8B, forming the body 12 using MIM or PM injection molding enables forming the body 12 to have a more complex net or near net shape in order to further reduce the amount of material used. For example, as shown in FIGS. 8A-8B, the body 12 can be formed with one or more recesses 62 in the flutes 22 of the body 12. These flutes 22 may be formed with the MIM or PM injection molding processes without the need for any additional machining or grinding operations. These recesses reduce the amount of material used without adversely impacting performance.

Figure 9B:
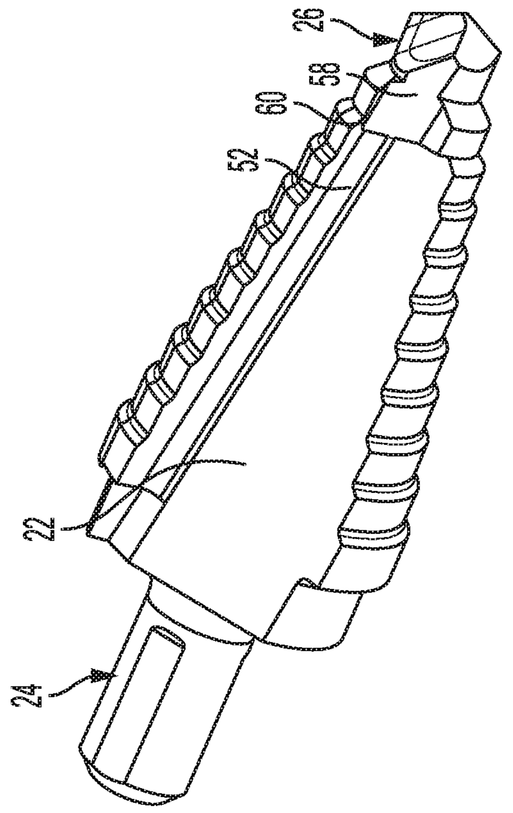
FIG. 9B is a perspective view of another embodiment of a step drill bit.
Figure 9A:
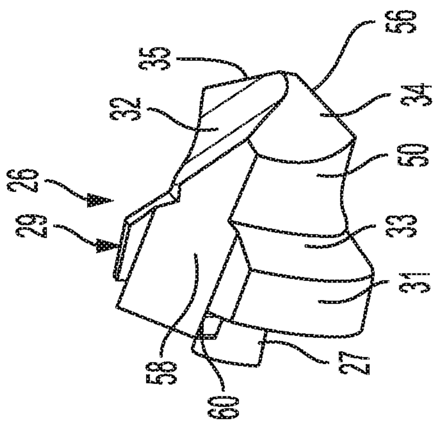
FIG. 9A is a perspective view of another embodiment of a cutting insert.

Referring to FIGS. 9A-9B, in another embodiment, a cutting head portion 26 may have substantially the same configuration as one of the aforementioned cutting heads 26 (e.g., the cutting head portion 26 shown in FIGS. 1A-1B, 2A, and 3F) except that the cutting head portion 26 further includes a tab 60 extending rearward from the chip clearing recess 58. The tab is configured to be received in a groove in the body 12 (e.g., in the same groove that receives the cutting strip 40) to rotationally align the cutting head portion 26 with the body 12. The tab 60 may also be received by the carbide cutting edge in the flute 22.

Figure 11:
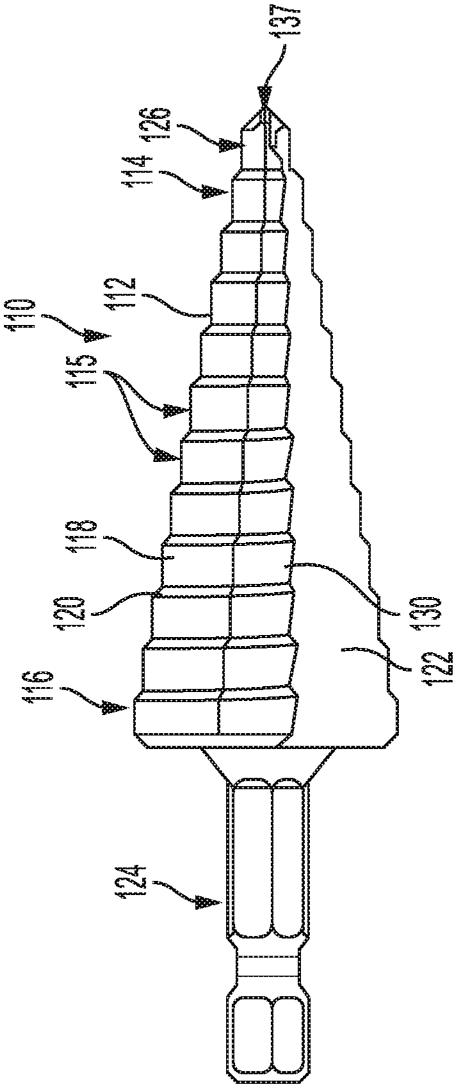
FIG. 11 is a side view of another embodiment of a step drill bit.
Figure 12B:
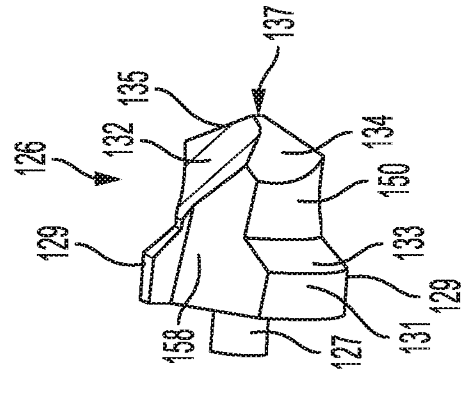
FIG. 12B is a perspective view of the cutting insert of the step drill bit of FIG. 11.
Figure 12A:
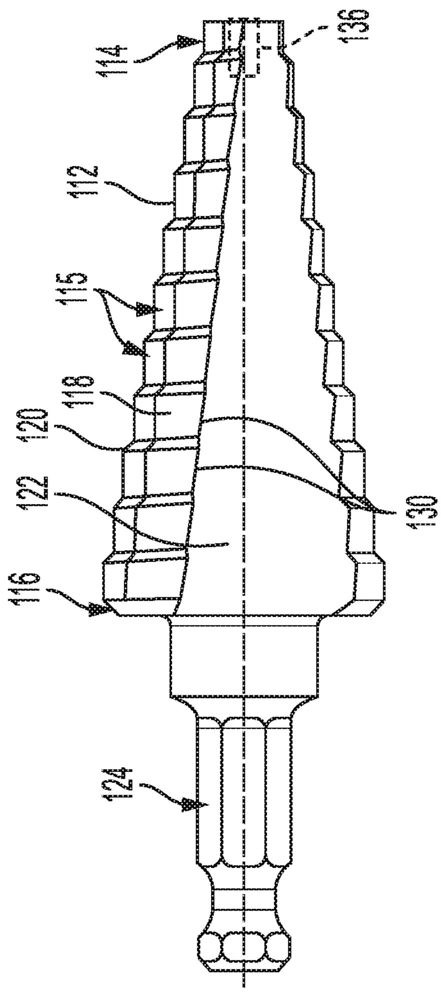
FIG. 12A is a side view of the body of the step drill bit of FIG. 11.
Figure 13A:
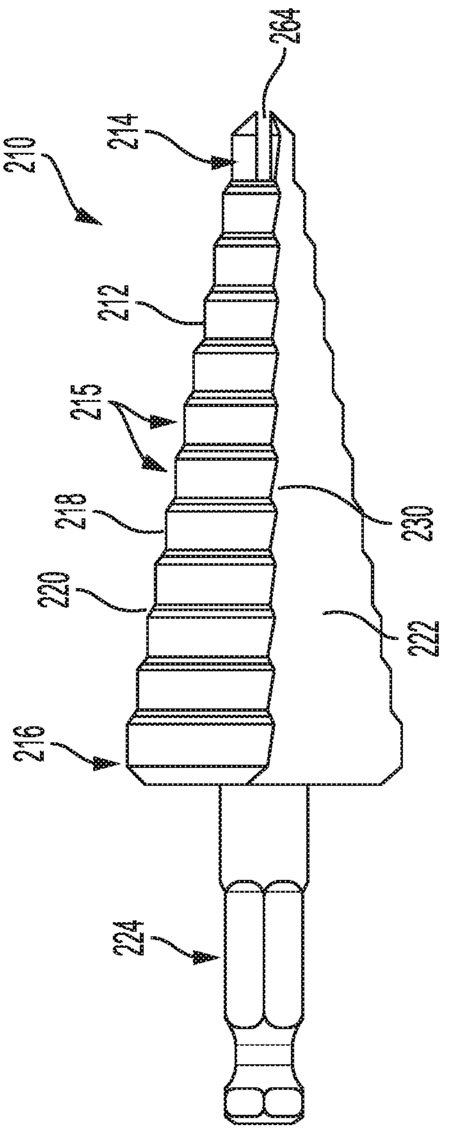
FIG. 13A is a side view of a body of another embodiment of a step drill bit.
Figure 13C:
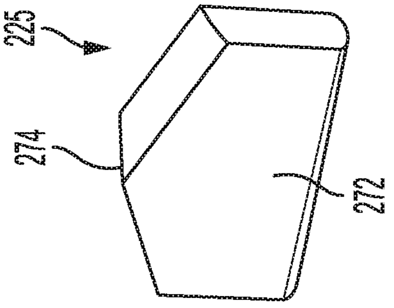
FIG. 13C is a perspective view of a cutting insert for the step drill bit of FIG. 13A.
Figure 13B:
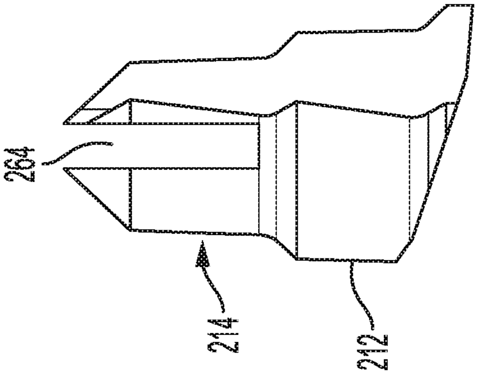
FIG. 13B is a close-up side view of the front end portion of the body of FIG. 13A.

Referring to FIGS. 11-12B, another embodiment of a step drill bit 110 includes a body 112 having a front end portion 114 and a rear end portion 116. The body 112 has a plurality of steps 115, each having a cylindrical portion 118 and a tapered portion 120, the cylindrical portions 118 increasing in diameter from the front end portion 114 to the rear end portion 116. At least one flute 122 is formed in the body 112 and extends from the front end portion 114 to the rear end portion 116. There may be only one flute, two flutes, or a greater number of flutes. The flute(s) may be flat, concave, or have an alternative configuration. Each cylindrical portion 118 defines a sharp cutting edge 130 at a junction between the cylindrical portion 118 and the flute 122 A shank 124 is coupled to the rear end portion 116 of the body 112 and is configured to be received in a tool holder (e.g., a chuck or tool bit holder) of a rotary power tool (e.g., a drill, a drill/driver, or an impact driver). In the illustrated embodiment, the shank 124 is generally hex shaped for being engaged by a portion of the tool holder, such as chuck jaws or a quick release tool holder. As illustrated, the shank 124 is formed integrally with the body 112. In other embodiments, the shank 124 may be a separate piece from the body 112.

The body 112 is composed of a steel alloy that has sufficient hardness and durability so that the cutting edges 130 are able to cut metal workpieces, such as steel sheet metal and plates. For example, the body 112 may be composed of high speed steel, e.g., steel has a minimum total of 5% of any combination of the following refractory elements: tungsten, cobalt, molybdenum, and vanadium. A near net shape of the body 112 and shank 124 may be formed by casting, molding, grinding, and/or machining a piece of high speed steel. Alternatively, the body 112 and/or shank 124 may be formed by MIM or PIM injection molding. In addition, the high speed steel may be heat treated at a high temperature (e.g., at least 2000°), quenched, and then tempered. The body 112 may have a high hardness, e.g., a Rockwell hardness of at least 60 HRC, and be able to withstand the high temperatures (e.g., around 1000° F.) experienced when drilling holes in steel workpieces without a substantial reduction in hardness. Although other types of mild or low carbon steel may have hardness at room temperature of at least 60 HRC, they tend to substantially soften when drilling through steel at these high temperatures.

In addition, a cutting insert 125 is coupled to the front end portion 114 of the body 112 to form a cutting head portion 126 that is configured to penetrate a metal workpiece. In the illustrated embodiment, the cutting head portion 126 is formed entirely of the cutting insert 125. The cutting head portion 126 includes a center cutting tip 137, at least one cutting edge 135 extending radially outward and axially rearward from the center cutting tip 137, a rake face 132 extending rearward from the cutting edge 135 toward the rear end portion 116, and a relief face 134 extending circumferentially from the cutting edge 135 in a direction opposite the rotational cutting direction of the drill bit. In an embodiment, the rake face 132 of the cutting head is disposed at a a positive rake angle, e.g., approximately 5° to 15°, relative to the rotational axis X. The relief face of the cutting head is disposed at a relief angle of approximately 15° to 35° relative a plane orthogonal to the rotational axis X.

The body 112 includes a front bore 136 in its front end portion 114 and the cutting head portion 126 includes a post 127 received in the front bore 136. As illustrated the front bore and the post 127 each have a cylindrical geometry. However, they may have other geometries such as being conical or having a non-circular geometry (e.g., a hex shaped or double-D shaped cross-section). The cutting head portion 126 also includes a chip clearing recess 158 in communication with and adjacent to the flute 122 in the body 112. The cutting head portion 126 also may include a first step 129 that is smaller in diameter than the smallest diameter step at the front end portion 114 of the body 112. The first step 129 has a first cylindrical portion 131 and a first tapered portion 133 similar to the cylindrical portions 118 and tapered portions 120 of the body 112 but with a smaller diameter.

The cutting insert 125 may be formed from a second material that is harder and more durable than the high speed steel alloy that forms the body 112. For example, the cutting insert 125 may be composed of carbide, cermet, or diamond, and may have a Rockwell hardness of at least 80 HRC. The harder cutting insert 125 facilitates initial entry of the step drill bit into a metal workpiece. The cutting insert 125 may be joined to the body 112, e.g.., by brazing, welding, adhesive, or mechanical connection (e.g., press fit or interference fit). As part of the same or a separate step as joining, the body 112 and shank 124 may be heat treated (e.g., by one or more heating and cooling cycles). In an embodiment, the cutting insert 125 may be affixed to the front end portion by braze that has a melting temperature less than the heat treat temperature and a vaporization temperature greater than the heat treat temperature for the body prior to rapidly cooling and tempering the high speed steel. For example, the heat treat temperature of the steel for the body may be between approximately 2000° F. and 2200° F. and the melting temperature of the braze may be at least approximately 1800° F., while its vaporization temperature is greater than 3000° F. After joining and heat treating, one or more grinding or machining steps is performed to form the flute 122 and cutting edges 130 and to form one or more chip clearing recesses 158, cutting edges 35, rake faces 32, and relief faces 34 in the cutting head portion 26. Finally, the step drill bit may be washed and etched Referring to FIGS. 12-16, another embodiment of a step drill bit 210 includes a body 212 having a front end portion 214 and a rear end portion 216. The body 212 has a plurality of steps 215, each having a cylindrical portion 218 and a tapered portion 220, the cylindrical portions 218 increasing in diameter from the front end portion 214 to the rear end portion 116. At least one flute 222 is formed in the body 212 and extends from the front end portion 214 to the rear end portion 216. There may be only one flute, two flutes, or a greater number of flutes. The flute(s) may be flat, concave, or have an alternative configuration. Each cylindrical portion 218 defines a sharp cutting edge 230 at a junction between the cylindrical portion 218 and the flute 222 A shank 224 is coupled to the rear end portion 216 of the body 212 and is configured to be received in a tool holder (e.g., a chuck or tool bit holder) of a rotary power tool (e.g., a drill, a drill/driver, or an impact driver). In the illustrated embodiment, the shank 224 is generally hex shaped for being engaged by a portion of the tool holder, such as chuck jaws or a quick release tool holder. As illustrated, the shank 224 is formed integrally with the body 212. In other embodiments, the shank 224 may be a separate piece from the body 212.

The body 212 is composed of a steel alloy that has sufficient hardness and durability so that the cutting edges 230 are able to cut metal workpieces, such as steel sheet metal and plates. For example, the body 212 may be composed of high speed steel, e.g., steel has a minimum total of 5% of any combination of the following refractory elements: tungsten, cobalt, molybdenum, and vanadium. A near net shape of the body 212 and shank 224 may be formed by casting, molding, grinding, and/or machining a piece of high speed steel. Alternatively, the body 212 and/or shank 224 may be formed by MIM or PIM injection molding. In addition, the high speed steel may be heat treated at a high temperature (e.g., at least 2000°), quenched, and then tempered. The body 212 may have a high hardness, e.g., a Rockwell hardness of at least 60 HRC, and be able to withstand the high temperatures (e.g., around 1000° F.) experienced when drilling holes in steel workpieces without a substantial reduction in hardness. Although other types of mild or low carbon steel may have hardness at room temperature of at least 60 HRC, they tend to substantially soften when drilling through steel at these high temperatures.

A cutting insert 225 is coupled to the front end portion 214 of the body 112 to form a cutting head portion 226 that is configured to penetrate a metal workpiece. In the illustrated embodiment, the cutting insert 225 has a base portion 272 with a rectangular prismatic shape and a triangular or roof shaped top portion 274. The base portion 272 is received in a slot 264 transverse to the rotational axis X in the front end portion 214 of the body 212. In this embodiment, the cutting head portion 226 is formed in part by the cutting insert 225 and in part by the front end portion 214 of the body. The cutting insert 215 may be formed from a second material that is harder and more durable than the high speed steel alloy that forms the body 212. For example, the cutting head portion 226 may be composed of carbide, cermet, or diamond, and may have a Rockwell hardness of at least 80 HRC. The harder cutting insert 225 facilitates initial entry of the step drill bit into a metal workpiece.

Figure 14B:
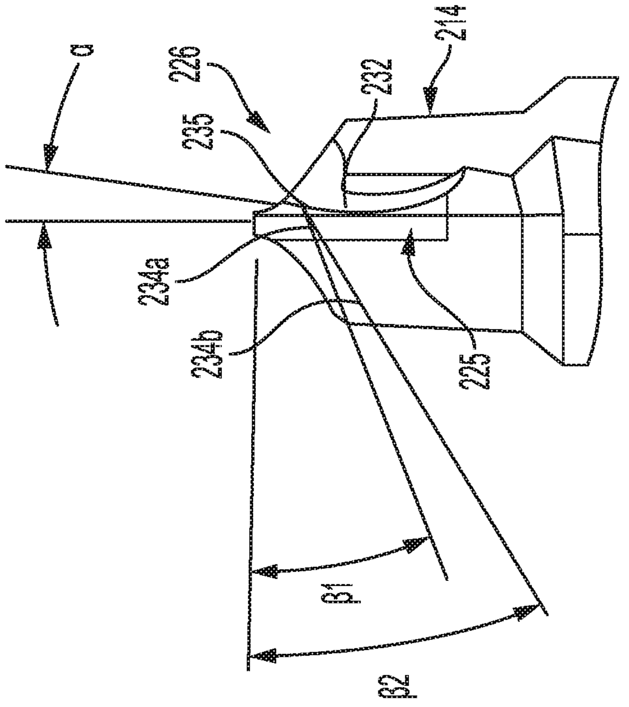
FIG. 14B is a close-up side view of another implementation of the cutting head portion of the step drill bit of FIG. 13A.
Figure 14A:
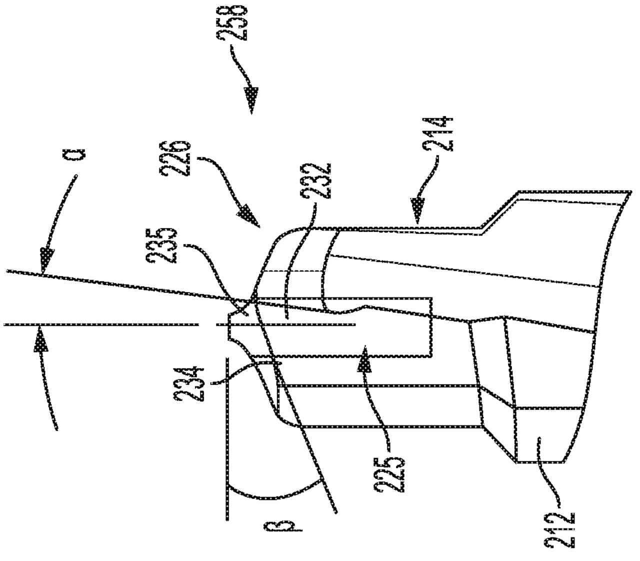
FIG. 14A is a close-up side view of an implementation of the cutting head portion of the step drill bit of FIG. 13A.
Figure 15:
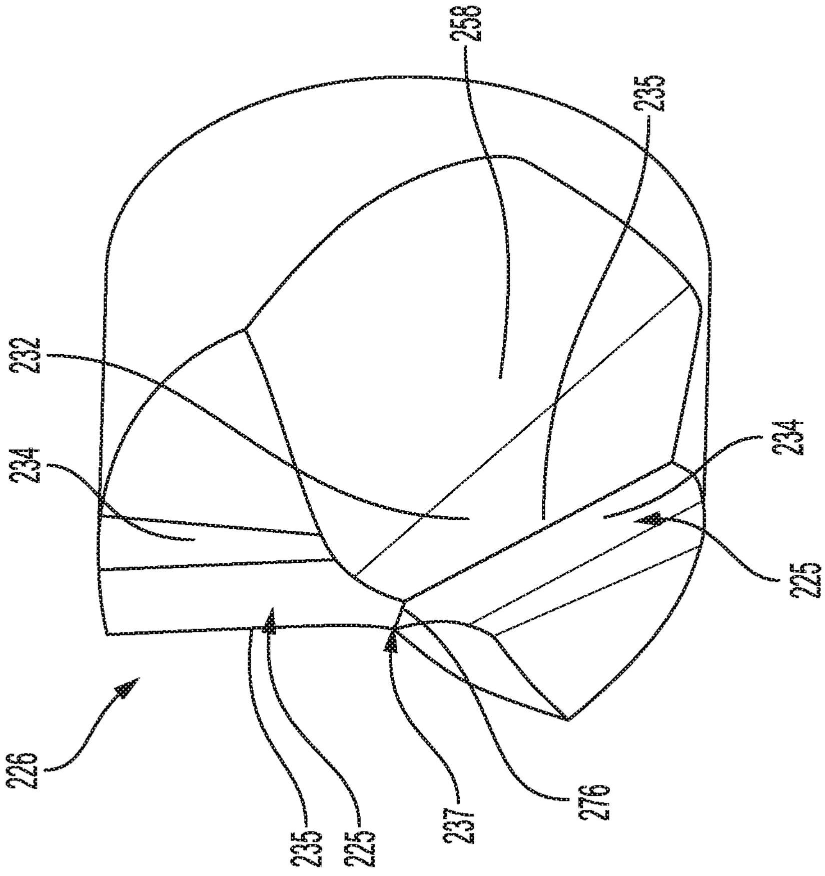
FIG. 15 is a close-up perspective view of the cutting head portion of the step drill bit of FIG. 13A.
Figure 16:
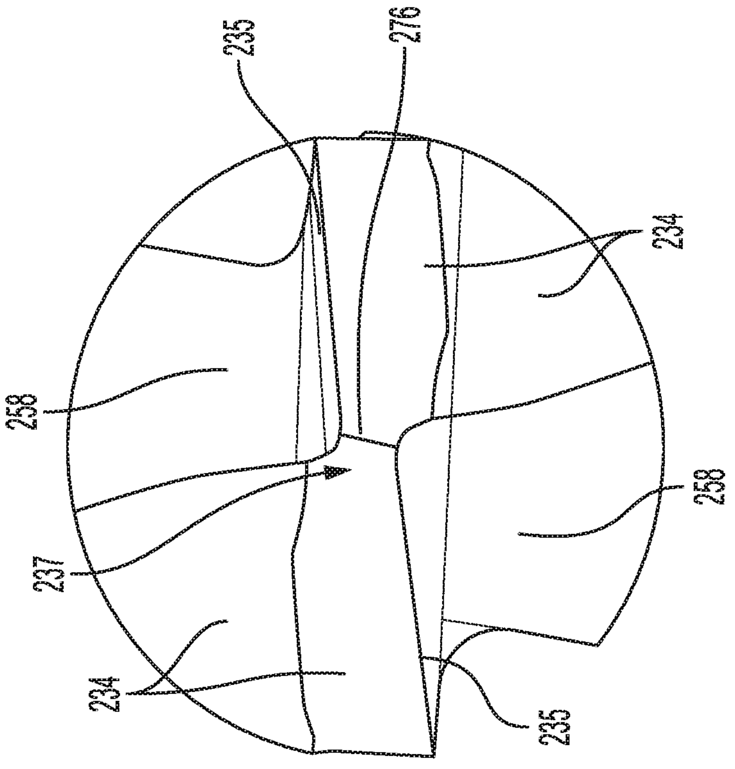
FIG. 16 is a close-up front end view of the cutting head portion of the step drill bit of FIG. 13A.

Together, the cutting insert 225 and the front end portion 214 of the body 212 form the cutting head portion 226. The cutting head portion 226 includes a center cutting tip 237 with a chisel edge 239, at least one cutting edge 235 extending radially outward and axially rearward from the center cutting tip 237, and a rake face 232 extending rearward from the cutting edge 235 toward the rear end portion 216, where the center cutting tip 237, the cutting edge 235, and the rake face 232 are formed substantially entirely in the cutting insert 225. The cutting head portion 214 also includes a relief face 234 extending circumferentially from the cutting edge 235 in a direction opposite the rotational cutting direction of the drill bit and including both the cutting insert 225 and the front end portion 214 of the body 212. The cutting head portion 226 also may include a chip clearing recess 258 formed substantially entirely in the front end portion 214. The chip clearing recess 258 is faced by the rake face 232 and is in communication with and adjacent to the flute 222 in the body 212. In an embodiment, the rake face 232 is disposed at a positive rake angle $\alpha$, e.g., approximately 5° to 15°, relative to the rotational axis X. In one implementation, as shown in FIG. 14A, the relief face 234 may be disposed at a relief angle $\beta$, e.g., approximately 15° to 35° relative a plane P orthogonal to the rotational axis X. In another implementation, as shown in FIG. 14B, the relief face 234 of the cutting head portion may have a primary relief surface 234*a* adjacent the cutting edge and disposed at a primary relief angle $\beta 1$, e.g., approximately 15° to 35°, and a secondary relief surface 234*b* trailing the primary relief surface in the rotational cutting direction and disposed at secondary relief angle β2 that is greater than the primary relief angle, e.g., approximately 25° to 35°.

The cutting insert 225 is joined to the body 212, e.g.., by brazing, welding, adhesive, or mechanical connection (e.g., press fit or interference fit). As part of the same or a separate step as joining, the body 212 and shank 224 may be heat treated (e.g., by one or more heating and cooling cycles). In an embodiment, the cutting insert 225 may be affixed to the front end portion by braze that has a melting temperature less than the heat treat temperature and a vaporization temperature greater than the heat treat temperature for the body prior to rapidly cooling and tempering the high speed steel. For example, the heat treat temperature of the steel for the body may be between approximately 2000° F. and 2200° F. and the melting temperature of the braze may be at least approximately 1800° F., while its vaporization temperature is greater than 3000° F. After joining and heat treating, one or more grinding or machining steps may be performed to form one or more of the flute 222, the rake face 232, relief face 234, the chip clearing recesses 258, the chisel edge 239, and the cutting edges 230, 235. Finally, the step drill bit may be washed and etched Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A step drill bit comprising:

a body, composed of high speed steel, defining a rotational axis and including a front end portion, a rear end portion, a plurality of cylindrical steps of increasing diameter from the front end portion toward the rear end portion of the body, a flute extending rearward from the front end portion toward the rear end portion, and a longitudinal groove adjacent the flute, wherein each step defines a cutting edge at a junction between the step and the flute;

a shank coupled to the rear end portion of the body, and receivable in a tool holder of a rotary power tool;

a cutting insert non-removably coupled to the front end portion and at least partially defining a cutting head portion of the drill bit, the cutting insert having a hardness greater than the high speed steel, the cutting insert composed of carbide, cermet, or diamond; and a cutting strip received in the longitudinal groove and coupled to the front end portion and the rear end portion of the body, the cutting strip including a plurality of steps that are continuous with the steps in the body, wherein the cutting head portion includes a center cutting tip, a cutting edge that extends radially outward from the cutting tip, a rake face extending from the cutting edge toward the rear end portion of the body, a relief face extending from the cutting edge in a circumferential direction opposite a rotational cutting direction of the drill bit, a chip clearing recess in communication with the flute with the rake face facing the chip clearing recess in the rotational cutting direction of the drill bit, and a tab extending rearward from the chip clearing recess for receipt in the longitudinal groove to rotationally align the cutting head portion with the body.

2. The step drill bit of claim 1, wherein the front end portion includes a slot transverse to the rotational axis and the cutting insert includes a base portion with a prismatic shape received in the slot, and wherein the cutting head portion is defined partially by cutting insert and partially by the front end portion of the body.

3. The step drill bit of claim 1, wherein the cutting insert includes the center cutting tip, the cutting edge, the rake face, and a leading portion of the relief face extending from the cutting edge.

4. The step drill bit of claim 3, wherein the front end portion includes the chip clearing recess with the rake face of the cutting insert facing the chip clearing recess, and a trailing portion of the relief face extending circumferentially from the leading portion of the relief face in the direction opposite the rotational direction of the drill bit.

5. The step drill bit of claim 1, wherein the cutting head portion is formed entirely from the cutting insert, with the cutting insert including the center cutting tip, the cutting edge, the rake face, the relief face, and the chip clearing recess with the rake face facing the chip clearing recess in the rotational cutting direction of the drill bit.

6. The step drill bit of claim 5, wherein the cutting insert further defines a first cylindrical step having a first diameter that is greater than the diameter of the cutting head portion and smaller than diameters of each of the cylindrical steps on the body.

7. The step drill bit of claim 1, wherein the body includes a second flute diametrically opposite the flute, and the cutting head portion includes a second cutting edge that extends radially outward from the cutting tip diametrically opposite the cutting edge, a second rake face extending from the second cutting edge toward the rear end portion of the body, a second relief face extending from the cutting edge in a circumferential direction opposite the rotational cutting direction of the drill bit, and a second chip clearing recess in communication with the second flute with the second rake face facing the chip clearing recess in the rotational cutting direction of the drill bit.

8. The step drill bit of claim 7, wherein the cutting tip includes a chisel edge extending between the cutting edge and the second cutting edge.

9. The step drill bit of claim 1, wherein the rake face is disposed at a positive rake angle of approximately 5° to 15° relative to the rotational axis.

10. The step drill bit of claim 1, wherein the relief face is disposed at a relief angle of approximately 15° to 35° relative to a plane orthogonal to the rotational axis.

11. The step drill bit of claim 1, wherein the relief face includes a primary relief surface disposed at a first relief angle relative to a plane orthogonal to the rotational axis and a secondary relief surface trailing the primary relief surface and disposed at a second relief angle that is greater than the primary relief angle.

12. The step drill bit of claim 1, wherein the cutting insert is affixed to the front end portion by braze that has a melting temperature less than and a vaporization temperature greater than a heat treat temperature for heat treating the high speed steel prior to rapidly cooling and tempering the high speed steel.

13. The step drill bit of claim 12, wherein the heat treat temperature of the high speed steel is between approximately 2000° F. and 2200° F. and the melting temperature of the braze is at least approximately 1800° F.

14. The step drill bit of claim 1, wherein the high speed steel has a Rockwell hardness of at least 60 HRC.

15. The step drill bit of claim 1, wherein the body is formed by metal injection molding or powder metal molding.

16. A step drill bit comprising:

a body defining a rotational axis and including a front end portion, a rear end portion, a plurality of cylindrical steps of increasing diameter from the front end portion toward the rear end portion of the body, a flute extending rearward from the front end portion toward the rear end portion, and a longitudinal groove adjacent the flute, wherein each step defines a cutting edge at a junction between the step and the flute;

a shank coupled to the rear end portion and configured to be received in a tool holder of a rotary power tool;

a cutting insert coupled to the front end portion and at least partially defining a cutting head portion, the cutting head portion including a center cutting tip, a cutting edge that extends radially outward from the cutting tip, a rake face extending from the cutting edge toward the rear end portion of the body, a relief face extending from the cutting edge in a circumferential direction opposite a rotational cutting direction of the drill bit, and a chip clearing recess in communication with the flute with the rake face facing the chip clearing recess in the rotational cutting direction of the drill bit;

an elongated cutting strip received in the longitudinal groove and non-removably coupled to the front end and the rear end of the body, the elongated cutting strip including a plurality of steps each defining a cutting edge, the steps on the elongated strip having diameters that correspond to the diameters of the steps in the body, wherein the elongated cutting strip and the cutting head portion are formed as separate components, and wherein the body is composed of a first material having a first hardness, the cutting head is composed of a second material having a greater hardness than the first hardness, and the cutting strip is composed a third material having a third hardness that is greater than the first hardness.

17. The step drill bit of claim 16, wherein the first material is a low carbon steel or a tool steel, the second material is a carbide, cermet, diamond, or high speed steel, and the third material is a carbide, cermet, diamond, or high speed steel.

18. The step drill bit of claim 16, wherein the cutting head portion includes a first step that is smaller in diameter than the step at the front end of the body.

19. The step drill bit of claim 16, wherein the front end portion includes a slot transverse to the rotational axis and the cutting insert includes a base portion with a prismatic shape received in the slot, and wherein the cutting head portion is defined partially by cutting insert and partially by the front end portion of the body.

20. The step drill bit of claim 16, wherein the cutting head portion is formed entirely from the cutting insert, with the cutting insert including the center cutting tip, the cutting edge, the rake face, the relief face, and the chip clearing recess with the rake face facing the chip clearing recess in the rotational cutting direction of the drill bit.

21. A step drill bit comprising:

a body, composed of a first material having a first hardness, defining a rotational axis and including a front end portion, a rear end portion, a first plurality of cylindrical steps defining cutting edges of increasing diameter from the front end portion toward the rear end portion, a flute extending from the front end portion toward the rear end portion, and a groove adjacent the flute;

a cutting insert non-removably coupled to the front end portion and at least partially defining a cutting head portion composed of a second material having a second hardness that is greater hardness than the first hardness, the cutting head portion having a chip clearing recess and a tab extending rearward from the chip clearing recess for receipt in the groove to rotationally align the cutting head portion with the body; and a cutting strip, composed a third material having a third hardness that is greater than the first hardness, received in the groove and coupled to the front end portion and the rear end portion of the body, the cutting strip including a second plurality of cylindrical steps defining cutting edges of increasing diameter from the front end portion toward the rear end portion, wherein the second plurality of cylindrical steps are continuous with the first plurality of cylindrical steps.

22. The step drill bit of claim 21, wherein the cutting strip and the cutting head portion are formed as separate components.

* * * * *